United States Patent Office 3,427,167

Patented Feb. 11, 1969

3,427,167

PRODUCT AND PROCESS FOR ENHANCING THE GRAPE-LIKE FLAVOR OF FOOD PRODUCTS

James L. Michael, Arlington Heights, and Harold W. Jackson, Libertyville, Ill., assignors to National Dairy Products Corporation, New York, N.Y., a corporation of Delaware No Drawing. Filed Aug. 30, 1965, Ser. No. 483,789

U.S. Cl. 99—140 6 Claims

Int. Cl. A23l 1/26

ABSTRACT OF THE DISCLOSURE

Enhancing the grape-like flavor of food products by adding thereto an effective amount of methyl-beta-hydroxybutyrate, ethyl-beta-hydroxybutyrate or mixtures thereof.

The present invention relates generally to grape or grape-like products, and more particularly, it relates to providing grape or grape-like products having enhanced grape flavor.

One of the more popular and well-liked fruits for the preparation of juice, jam, jelly and the like is grapes. As is also true with other fruits, however, processing of grapes under elevated temperatures for purposes of preservation causes loss of natural flavor and aroma components, resulting in a product that lacks the aroma and flavor of fresh grapes. Even in the absence of elevated temperature processing conditions, natural flavor and aroma are lost with length of storage.

Various methods have been used to reduce the loss of flavor and aroma components during the processing of grapes. For example, it is known to collect and condense the vapors of flavor and aroma components of grape juice and to subsequently reintroduce the condensed vapors at a later point in the process. An example of this process is set forth in U.S. Patent No. 3,061,448. The vapors are usually recovered in a form that is enriched in the flavor and aroma components of the fresh juice to provide a 100-fold to 150-fold essence, that is, a material in which the flavor and aroma components are from about 100 times to 150 times more concentrated than in fresh juice. As used, hereinafter, the term essence refers to concentrated flavor and aroma components of fresh grape juice.

The essence thus produced, when added to processed grape products such as juice concentrate, aids in enhancing its aroma and flavor to more nearly duplicate that of a fresh grape product. However, when a taste comparison is made, such as between fresh grape juice and a reconstituted grape juice prepared from a grape juice concentrate to which essence has been added, the fresh product is almost always preferred.

Accordingly, it is desirable to produce grape and grape-like products that have a taste more closely resembling that of fresh grapes and grape juice.

It is a principle object of the present invention to provide means for improving the flavor of grape or grape-like products. A more particular object of the present invention is to provide means for improving the flavor and aroma of grape products which have been subjected to heat treatment. A further object of the present invention is to provide flavoring compositions which resemble fresh grape juice in flavor and aroma. A still further object of the present invention is to provide beverages that closely resemble the flavor and aroma of fresh grape juice.

Other objects and advantages of the present invention will become apparent from the following description.

The present invention generally comprises improving the flavor and aroma of grape or grape-like products, such as grape juice or grape jelly, by the addition of small amounts of particular compounds thereto. In this connection, the principal compounds present in natural grape essence have been identified and it is known that the aroma and flavor of a synthetic essence prepared from such identified compounds only slightly resembles the aroma and flavor of natural grape juice essence. See Holley et al., The Identification of Some Volatile Constituents of Concord Grape Juice, Journal Paper No. 982, New York State Agricultural Experiment Station, Geneva, N.Y. (1955).

However, it has now been discovered that grape or grape-like products having substantially improved flavor and aroma may be prepared by adding thereto ethyl-beta-hydroxybutyrate, methyl-beta-hydroxybutyrate, or mixtures thereof. Such compounds may be utilized in natural products to enhance their flavor, or they may be utilized as components of an artificial grape flavor to provide a grape-like product.

The flavoring compounds are added at a total level of from about 30 parts per million to about 100 parts per million of the finished product, expressed as parts by weight. Generally it is preferable to use mixtures of ethyl-beta-hydroxybutyrate and methyl-beta-hydroxybutyrate. A preferred ratio is three parts of the ethyl-beta-hydroxybutyrate to one part methyl-beta-hydroxybutyrate.

The following examples further illustrate various features of the present invention.

EXAMPLE I

A synthetic grape drink was prepared according to the following procedure.

A syrup base solution was prepared containing the listed components in percentages by weight.

| Component: | Wt. percent |
|---|---|
| Water | 24.2 |
| Sucrose | 73.5 |
| Citric acid | 2.2 |
| Tannic acid | .08 |
| Grape coloring | .06 |

100 ml. of the syrup base were then added to one quart of water and the following components were added to yield the indicated weight percentages in parts per million.

| Component: | Wt. composition, p.p.m. |
|---|---|
| Ethanol | 475 |
| Ethyl acetate | 47.5 |
| Methyl acetate | 2.0 |
| Acetone | 4.0 |
| Acetaldehyde | .4 |
| 2-hexenal | .03 |
| 3-hexanol | .03 |
| Methyl anthranilate | 7.2 |
| Acetic acid | 31.7 |
| Methyl-beta-hydroxybutyrate | 63.4 |
| Ethyl-beta-hydroxybutyrate | 21.1 |

The synthetic grape drink prepared according to the above procedure was then compared in blind comparison tests to an identical synthetic grape drink prepared according to the above procedure with the exception that the ethyl-beta-hydroxybutyrate and methyl-beta-hydroxybutyrate were omitted. The tasting panel preferred the synthetic grape drink containing the flavoring compounds of this invention to the one in which they were omitted by a margin of 8 to 1.

EXAMPLE II

A synthetic grape drink was prepared by adding the following materials to water to provide a mixture having the indicated composition.

| Material: | Wt. composition |
|---|---|
| Water, percent | 87 |
| Sucrose, percent | 12.62 |
| Citric acid, percent | 0.33 |
| Grape coloring, p.p.m. | 95 |
| Ethyl acetate, p.p.m. | 45 |
| Methyl acetate, p.p.m. | 1.9 |
| Acetone, p.p.m. | 3.8 |
| Acetaldehyde, p.p.m. | 0.4 |
| Acetic acid, p.p.m. | 0.4 |
| Methyl anthranilate, p.p.m. | 3.4 |
| 2-hexenal (cis), p.p.m. | 0.05 |
| 3-hexenol (cis), p.p.m. | 0.25 |
| Ethyl-beta-hydroxybutyrate, p.p.m. | 94 |

The resultant synthetic grape drink had a flavor and aroma closely resembling that of natural grape juice. In blind comparisons with a natural grape juice drink, 45 percent of a tasting panel indicated a preference for the artificial grape drink as compared to 55 percent preferring the natural grape juice drink.

EXAMPLE III

A grape juice concentrate is prepared from natural grape juice by a vacuum evaporation process. A concentrate of 46° Brix is obtained, which is combined with 100-fold natural grape essence in the ratio of 100:1. To this is added sufficient ethyl-beta-hydroxybutyrate and methyl-beta-hydroxybutyrate to provide a level of 50 parts per million of each in reconstituted grape juice prepared from the concentrate.

The reconstituted grape juice produced using the flavoring compounds of this invention is then compared (a) to reconstituted concentrated grape juice to which natural grape essence alone has been added, and (b) to natural grape juice. The natural grape juice and the reconstituted grape juice of this invention are substantially similar and are substantially more flavorful than the reconstituted grape juice to which essence alone is added.

The preceding examples clearly illustrate the effectiveness of the addition of small amounts of the flavoring compounds to grape products.

Accordingly, improved grape and grape-like products are provided by the process of this invention. Such process and the product employ simple means for effectively enhancing the flavor and aroma of grape and grape-like products and provide synthetic products that are substantially similar to natural grape products.

Various of the features of the present invention are set forth in the appended claims.

What is claimed is:

1. A process for providing enhanced grape-like flavor and aroma to food products which process comprises adding a flavoring compound selected from the group consisting of methyl-beta-hydroxybutyrate, ethyl-beta-hydroxybutyrate, or mixtures thereof to the product, said flavoring compound being present in an amount sufficient to improve the flavor and aroma of the food product.

2. A process for providing enhanced grape-like flavor and aroma to food products which comprises adding a flavoring compound selected from the group consisting of methyl-beta-hydroxybutyrate, ethyl-beta-hydroxybutyrate, or mixtures thereof to the product, said flavoring compound being present at a level of from about 30 parts per million to about 100 parts per million by weight of the finished product.

3. A process for providing enhanced grape-like flavor and aroma to grape products which method comprises adding condensed grape essence to said grape product, and adding a flavoring compound selected from the group consisting of methyl-beta-hydroxybutyrate, ethyl-beta-hydroxybutyrate, or mixtures thereof to the product, said flavoring compound being present in an amount sufficient to improve the flavor and aroma of the grape product.

4. A process for providing enhanced grape-like flavor and aroma to grape products which method comprises adding condensed grape essence to said grape product, and adding a flavoring compound selected from the group consisting of methyl-beta-hydroxybutyrate, ethyl-beta-hydroxybutyrate, or mixtures thereof to the product, said flavoring compound being present at a level of from about 30 parts per million to about 100 parts per million by weight of the finished product.

5. An artificial, grape-like food product which product includes a flavoring compound selected from the group consisting of methyl-beta-hydroxybutyrate, ethyl-beta-hydroxybutyrate, or mixtures thereof to the product, said flavoring compound being present in an amount sufficient to improve the flavor and aroma of the food product.

6. An artificial, grape-like food product which product includes a flavoring compound selected from the group consisting of methyl-beta-hydroxybutyrate, ethyl-beta-hydroxybutyrate, or mixtures thereof to the product, said flavoring compound being present at a level of from about 30 parts per million to about 100 parts per million by weight of the finished product.

References Cited

UNITED STATES PATENTS 3,061,448 10/1962 Mojonnier et al. ------ 99—199

OTHER REFERENCES

Merck Index, Merck and Co., Inc., 1960, 7th ed., pages 425 and 673.

RAYMOND N. JONES, *Primary Examiner.*

H. H. KLARE III, *Assistant Examiner.*

U.S. Cl. X.R.

99—28, 78, 105, 129